United States Patent
Chanda

(10) Patent No.: US 9,961,082 B2
(45) Date of Patent: May 1, 2018

(54) ACCESS CONTROL FOR DIGITAL DATA

(71) Applicant: BlackBerry Limited, Waterloo (CA)

(72) Inventor: Rupen Chanda, San Francisco, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 111 days.

(21) Appl. No.: 15/018,643

(22) Filed: Feb. 8, 2016

(65) Prior Publication Data

US 2017/0230369 A1  Aug. 10, 2017

(51) Int. Cl.
*H04L 29/06* (2006.01)

(52) U.S. Cl.
CPC ............ *H04L 63/10* (2013.01); *H04L 63/062* (2013.01)

(58) Field of Classification Search
CPC .............................. H04L 63/10; H04L 63/062
See application file for complete search history.

(56) References Cited

U.S. PATENT DOCUMENTS

| | | | |
|---|---|---|---|
| 7,783,666 B1 * | 8/2010 | Zhuge | G06F 17/30082 707/783 |
| 2007/0098168 A1 * | 5/2007 | Sung | H04N 7/162 380/228 |
| 2008/0282354 A1 * | 11/2008 | Wobber | G06F 21/6218 726/26 |
| 2009/0328156 A1 * | 12/2009 | Malaviarachchi | G06F 21/6218 726/4 |
| 2014/0373113 A1 * | 12/2014 | Robert | G06F 21/10 726/5 |

* cited by examiner

*Primary Examiner* — Beemnet Dada
(74) *Attorney, Agent, or Firm* — Jeffrey N. Giunta; Fleit Gibbons Gutman Bongini & Bianco P.L.

(57) ABSTRACT

A system and method to control access to data are disclosed. An access request is received from a requesting device to access requested data and a context for the requesting device is determined. An access pattern for the requested data is determined based at least on the request and the context. A deviation between the context and the access pattern is determined and based on determining the deviation, a decision request to allow or deny the access request is sent. Based on a response to the decision request, access to the requested data is allowed.

17 Claims, 6 Drawing Sheets

ACCESS CONTROL FOR DIGITAL DATA

FIELD OF THE DISCLOSURE

The present disclosure generally relates to controlling access to data, and more particularly to providing authorization for devices to access controlled data.

BACKGROUND

Data is able to be stored on many types of systems and devices that allow various devices or users to access that data. Data with controlled access is able to include many types of information, such as documents, images, video data, processing resource definitions, other data, or combinations of these. Data including sensitive information is able to be protected by various techniques. Examples of techniques used to protect data include Digital Rights Management (DRM) and Information Rights Management (IRM). These techniques often include encrypting the data and enforcing access control of the data. In some techniques, access control is provided by a user name and password combination that is entered to gain access to the document. In some examples, such data is able to be stored on devices that are available to many other devices, such as data stored on servers connected to the Internet.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
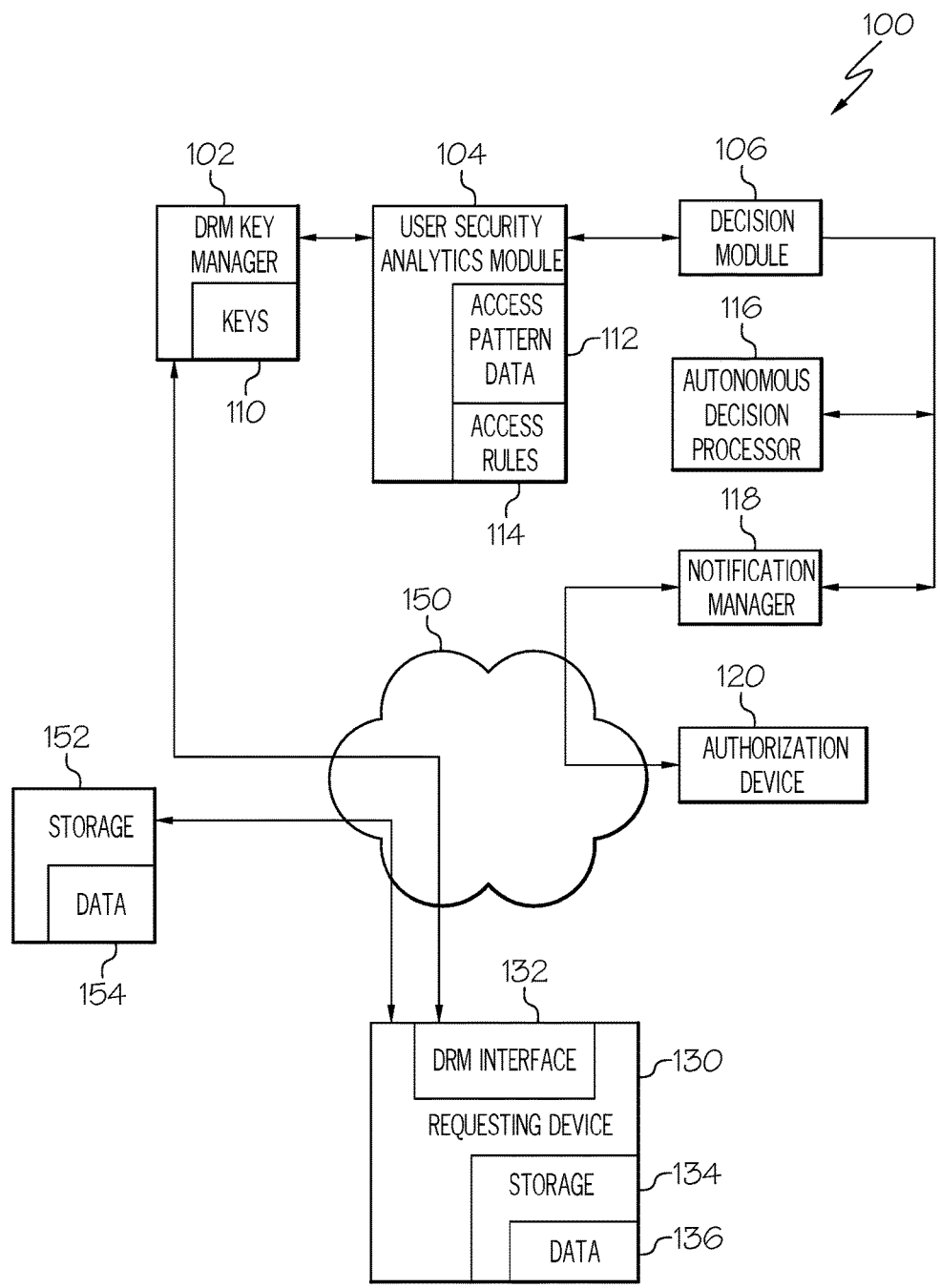
FIG. 1 illustrates a data access environment, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods operate to provide authorization to access data based on the context of the device requesting access to the data. In various examples, a context of a device requesting access is able to include any characterization of the device or any condition associated with the device. For example, a context of the device is able to include, without limitation, one or more of the following: a date or a time of the access request, a geographical location of the device at the time of making the access request, an Internet Protocol (IP) address of the device making the access request, data describing software being used by the device making the access request, a device identifier (ID) of the device making the access request, any other context description, or combinations of these.

Data may be made available to one or more requesting devices by any suitable technique. For example, a data is able to be delivered to the requesting device by any suitable technique, such as via electronic communications. In an example, data is able to be secured by any suitable technique such that external authorization is required to perform one or more functions with the data. Functions for which authorization may be specified to be required include, for example, viewing the data, accessing the data via any suitable technique, using the data, modifying the data, sending the data to any other device or devices, otherwise accessing or using part or all of the data, or any other such operation or process. The data is able to be available to the requesting device by any suitable technique, such as by being stored on the requesting device, accessed by the requesting device via communications with a storage device, by any other suitable retrieval technique, or combinations of these.

Access to protected data is able to be controlled by any suitable technique. Examples of access control techniques for protected data include Digital Rights Management (DRM) and Information Rights Management (IRM). In an example, Digital Rights Management (DRM) techniques are able to be applied to restrict access to the data and limit the permitted uses the data. In an example, accessing data with access controlled by DRM techniques may include requesting a decryption key or other authorizing token from a remote server that oversees access control of the data. Requesting such a decryption key or other authorizing token is an example of an access request made by a requesting device. Examples of access requests includes a requesting device sending a request for a DRM key from a DRM key server in order to access data protected by DRM techniques. In some examples, application programs that are able to access particular types of data include processing to support requesting a DRM key to access the data. The DRM key server is able to determine if a DRM key is to be provided to the requesting device. In some cases, the DRM key may limit the type of uses for which the data can be used.

Data to which access is controlled or protected is able to be any type of data. In an example, data protected and to which access is controlled is able to include any content, assets, resources, data (e.g., documents, files, e-mails, messages, images, video, media, or any digital data), any other type of data, or combinations of these. In an example, data that is protected or to which access is controlled is said to be created when a user or other process applies the data protection or access control scheme to a particular set of data. In the context of the following discussion, creating protected data refer to applying and configuring any access control, data protections, any other type of control, or combinations of these, to any data regardless of whether that data is already existing, being created, is to be modified by future processing, is any type of data, or combinations of these.

In some examples, requests associated with particular data are recorded in order to support determination of an access patterns. Requests that are able to be recorded include, but are not limited to, requests to access all or part of particular data, requests to access all or part of particular data for one or more particular uses, requests to access all or part of particular data for any use or for a particular use or uses by a particular requesting device. Access patterns in various examples include any characterization of accessing data protected by DRM techniques. Access patterns in various examples are able to include, without limitation, characteristics such as any of the following: locations from which requesting devices request access, the amount of time the requesting device accesses the data, the operations that are requested to be performed on the data, the frequency with which particular operation are requested to be performed, the amount of data on which an operation is to be performed, any other characterization or characterizations, or combinations of these. Access patterns may also include characterizations of circumstances under which requesting devices are requesting the access, such whether the requesting device is communicating over a Wi-Fi® connection, cellular data connection, wired data connection, or other types of data connections. Access patterns may also define how other devices request access, such as whether many devices request access to particular data at the same time, at similar times, within particular time intervals of each other, or similar observations. Access patterns are able to be defined or created by any suitable technique. For example, an access pattern is able to be defined based on an accumulated history of access requests for particular data or groups of data. In further examples, access patterns are able to be based on, for example, specified ranges of contexts for requesting devices, observed contexts of requesting devices for particular data or a group of data, based on any technique, or based on any combinations of these. In general, an access pattern is able to be associated with one set of data, with a group of data with the group defined according to any suitable technique, or with combinations of these.

In an example, requests for access to particular data are able to cause a notification of the access request to be sent to a specified authorization device. In an example, an authorization device is used by a person who is trusted to control and authorize access to particular data. In various examples, each set of data, or a group of data, is able to be associated with a particular authorization device to which notifications of access requests are sent. In an example, notifications are able to be sent to an authorization device based comparisons of the context of the requesting device sending the access request to determined access patterns associated with the data.

In some examples, authorization to access data is able to be based on an automated process that evaluates the context of the requesting device with criteria to determine if an access request is probably legitimate and is able to be granted, or if the context of the requesting device indicates the access request may be suspect and therefore refused. Automated processes to determine if a request should be granted or refused are able to include any type of evaluation processing including, for example, artificial intelligence, decision trees, other techniques, or combinations of these. In some examples, an automated process may determine if the context of a requesting device is within criteria to allow access to the data within particular data, and if that automated process fails to determine that access should be granted, a notification is sent to an authorization device to allow a user of that device to determine if the access should be granted or denied.

In an example, configuring the DRM access for particular data is able to include specification of the type of authorization processing is to be applied. For example, a person creating protected data that is protected by, for example, DRM techniques may specify that all authorizations for that data are to be provided based on a response to a notification sent to an authorization device. In another example, the creator of such protected data is able to specify conditions for which automated authorization is to be allowed, such as in response to access requests in a certain geographic area or within a specified Internet Protocol address range, and access requests not meeting those specified conditions are only to be granted based on a response to a notification to an authorization device. In yet a further example, the creator of protected data is able to specify that all access requests are to be handled by an automated process that performs an automated evaluation of the context of the requesting device. In an example, selecting among these different types of authorization processing is able to be based on a judgment of the sensitivity of the data and the impact unauthorized dissemination of that data might have. In this context, creating protected data refers to configuring the protection, access control, other control, or combinations of these, to data regardless of whether that data already exists, is being created, is data referring to other data to be created or modified in the future, is any type of data, or combinations of these.

In some examples, decisions to allow or deny access requests may be further based on data access policies. For example, a company may have a policy that employees are not to access certain data from particular countries. Access requests from those countries would be denied.

FIG. 1 illustrates a data access environment 100, according to an example. The data access environment 100 depicts a requesting device 130 that is able to use protected data. A network 160 in this illustrated example is used to support data communications between or among multiple devices, such as the illustrated requesting device 130 and a DRM key manager 102. The network 160 is also able to support data communications between or among other devices such as is described below.

The requesting device 130 in this example accesses data protected by DRM techniques by sending access requests to a DRM key manager 102. The DRM key manager 102 in this example is able to condition granting access to protected data based on authorizations provided by a user security analytics module 104. If the user security analytics module 104 allows the requesting device to perform the requested use of the data, the DRM key manager 102 retrieves an authorization token, such as DRM key from with a key storage 110, for the data and sends that authorization token to the requesting device. In an example, the user security analytics module 104 includes a programmable processor that is configured to execute programs to implement a context processor that operates in accordance with the examples described herein. The user security analytics module 104 further includes a data interface that receives access requests from requesting devices to access a requested data. In an example, this data interface communicates with the DRM key manager 102. In further examples, the data interface of the user security analytics module 104 is able to communicate with other components, such as with the requesting device itself either directly or through any other intermediate components.

The requesting device 130 includes a storage 134 that is shown to contain protected data 136. In various examples the storage 134 is able to store a number of data sets with some of the data being protected, some not being protected, or combinations of these. In some examples, other protected data 154 are able to be stored in a remote location, such as in a cloud storage 152 that is accessible to the requesting device 130 via any suitable electronic communications technique.

The requesting device 130 in an example includes various application programs or other facilities to use protected data, such as the data 136. Such application programs or other facilities are able to operate with a DRM interface 132 in an example in order to communicate with a DRM key manager 102 to receive access tokens, such as a DRM key, used to permit access the protected data 136. In general, a requesting device 130 is able to use any suitable technique to access protected data.

The DRM key manager 102 in this example receives requests to access protected data from remote devices, such as the illustrated requesting device 130. In general, there are able to be a large number of requesting devices that communicate with the DRM key manager 102 to request access to various protected data. Some of the access requests received by the DRM key manager 102 are able to include information about a context of the requesting device. The context of the requesting device is able to include any characteristic, such as those described above, of the requesting device. In an example, the context received from a requesting device includes the geographical location of the requesting device submitting the access request.

The DRM key manager 102 in an example is configured to send access requests for at least some protected data to a user security analytics module 104. These access requests include context information about the requesting device that sends the access request. The user security analytics module 104 in an example records received access requests along with the context of the requesting device. In an example, the user security analytics module 104 determines access pattern data 112 based on analysis of the multiple received access requests and the contexts of the requesting devices that send those requests. In an example, typical characteristics, or contexts, of requesting devices are able to be determined by analysis of a number of received access requests. A subsequently received access request is then able to be compared in some examples to the typical characteristics defined in the access pattern data to determine if the subsequently received access request is consistent with, or anomalous to, the typical characteristics that have been observed for access to the protected data for which the access request is received.

The user security analytics module 104 further contains access rules 114 that define the type of decision that is to be made when granting access to protected data. In an example, when protected data is configured with, e.g., DRM controls on its use, a user configuring the protection to apply to the data is able to define various access rules 114. Examples of access rules 114 are described in further detail below.

In various examples, the access rules 114 for particular protected data or a group of protected data may have any of several decision modes specified for each type of use of each protected data component. One type of access decision mode includes sending a notification of the access request to a specified authorization device so that a user of that authorization device is able to evaluate the access request and determine if the access request is to be allowed or denied. Another type of access decision mode is an automated access decision wherein the context of a device sending an access request is compared to various context definitions to automatically determine whether requested access is to be granted or denied. In various examples, such automated access decisions are able to be based on any evaluation techniques, such as comparison to defined context definitions, evaluation by an artificial intelligence process using any suitable techniques to evaluate the context requesting device submitting the access request in light of previously received access requests, any other technique, or combinations of these. In some examples, the access rules may specify that a decision to access the data is not required.

The user security analytics module 104 in an example is able to send decision requests to a decision module 106. The decision module 106 in an example preforms processing to support the specified decision as to whether to allow or deny a requested access request. In an example, the decision request sent by the user security analytics module 104 is able to specify whether a decision is to be based on an automated determination or based on a response to a notification provided to an authorization device. In further examples, other types of decisions are able to be supported by the decision module 106.

In the case of an automated decision, the decision module 106 operates with an autonomous decision processor 116. The autonomous decision processor 116 in an example implements various automated processing to evaluate whether the received access request is to be allowed or denied. The autonomous decision processor 116 is able to access pattern data 112 determined by the user security analytics module 104 to support the decision to allow or deny the access request. Details of the automatic decisions made by the autonomous decision processor 116 are described in detail below.

In the case of a decision that is to be based on a notification sent to an authorization device, the decision module 106 operates with a notification manager 118. The notification manager 118 in an example sends notifications to an authorization device 120. In an example, the particular authorization device 120 to which to send access requests for particular data is able to be defined in the access rules 114. The notification manager 118 in such a case will determine which authorization device 120 to send the notification based on accessing the access rules 114 in the user security analytics module 104. In further examples, the authorization device 120 is able to be specified by any suitable technique, such as sending all notifications for particular types of data to a specified authorization device 120.

The notification in various examples includes information describing the context of the requesting device 130 that submits the access request. A user of the authorization device 120 is then able to review the description of the context of the requesting device 130 and determine whether the request is to be allowed or denied. In an example, the authorization device 120 sends a response back to the notification manage 118 indicating whether to allow or deny the received access request. In an example, the notification manager 118 communicates with the authorization device 120 via the network 150. In further examples, communications between the notification manager 118 and the authorization device 120 is able to use any suitable communications techniques or combinations of communications techniques.

The decision manager 106 receives an indication from either the autonomous decision processor 116 or the notification manager 118 to allow or deny a particular access request. The decision manager 106 in an example returns to the user security analytics module 104 the indication to allow or deny the access request. The user security analytics module 104 in some examples is able to include the received decision into the access pattern data as a further basis of determining contexts that are associated with permissible access requests or with access requests that are suspect and may require further decision processing. In an example, histories of allowance or denial of access requests are able to be used by the autonomous decision processor 116 as a further bases for automatic determination of allowing or denying access. Further, histories of contexts of requesting devices for which access requests were allowed by the decision module 106 are able to be a basis in future determinations of which type of access determination is to be requested from the decision module 106.

Figure 2:
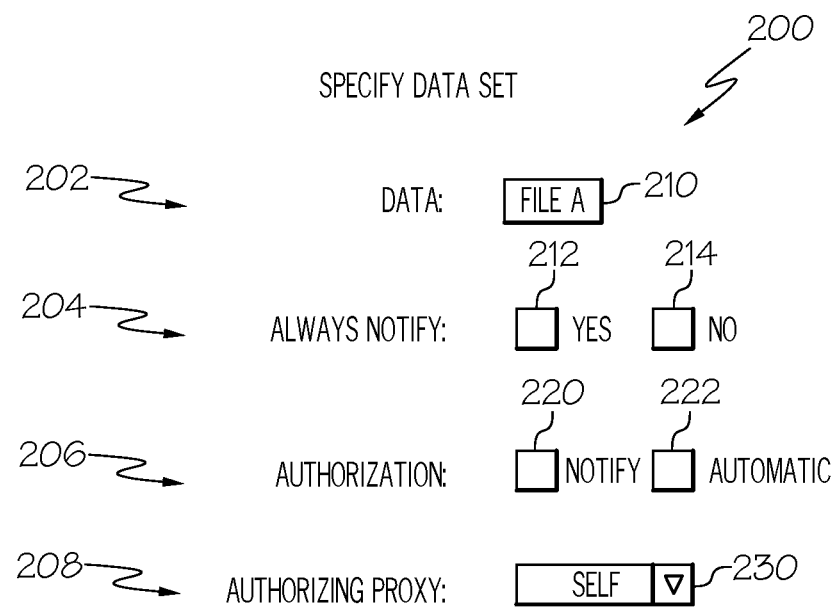
FIG. 2 illustrates a data set protection configuration interface, according to an example.

FIG. 2 illustrates a data set protection configuration interface 200, according to an example. The data set protection configuration interface 200 is an example of a user interface that allows a user to configure the DRM protections to be applied to data. In an example, the information provided through the data set protection configuration interface 200 is stored in the access rules 114 described above.

The data set protection configuration interface 200 includes a data specification row 202 that has a tag "DATA" and a data identity box 210 that allows specification of the data for which protection is being configured. The data identity box 210 in this example depicts "FILE A" and is a representation of a data file containing the data whose data is to be protected. In further examples, any suitable identification of the data is able to be used.

The data set protection configuration interface 200 includes an "ALWAYS NOTIFY" line 204. The "ALWAYS NOTIFY" line 204 has two selection boxes, a "YES" box 212 and a "NO" box 214. In an example, these two selection boxes are mutually exclusive, such that selecting the "YES" box 212 causes the "NO" box 214 to be deselected, and vice versa. Selecting the "YES" box 212 in this example configures the access rules for the specified data to cause a notification to be sent to an authorization device 120 for all access requests for data within the specified data. In some examples, this level of decision may be desired for very sensitive information. In some examples, when the "NO" box 214 is selected, the user security analytics module 104 determines if the context of the requesting device sending the access request is within acceptable range. If the context is determined to be within an acceptable range when the "NO box 214 is selected, the access request is allowed without notifying the authorization device 120 and may be based on other decision modules inputs or based on other defined access rules 114.

The data set protection configuration interface 200 has an "AUTHORIZATION" line 206 with a "NOTIFY" box 220 and an "AUTOMATIC" box 222. In an example, selecting the "NOTIFY" box 222 when the "ALWAYS NOTIFY" line 204 has the "NO" box 214 selected causes the user security analytics module 104 to determine if the context of the requesting device sending the access request is not within acceptable ranges prior to sending a notification to the authorizing device. If the "AUTOMATIC" box 222 is selected, the decision module 106 bases its decision on processing within the autonomous decision processor 116.

The data set protection configuration interface 200 has an "AUTHORIZATION PROXY" line 208. The "AUTHORIZATION PROXY" line 208 has an authorization device identifier input box 230 that allows a specification of an identifier of an authorization device 120 to which notifications are to be sent. The illustrated example depicts an identifier of "SELF" within the authorization device identifier input box 230 to indicate that notifications should be sent a device associated with the person configuring the data set protection. In general, any device is able to be set as the authorization device, 120, and in some examples multiple devices are able to be specified to all receive notifications of access requests.

Figure 3:
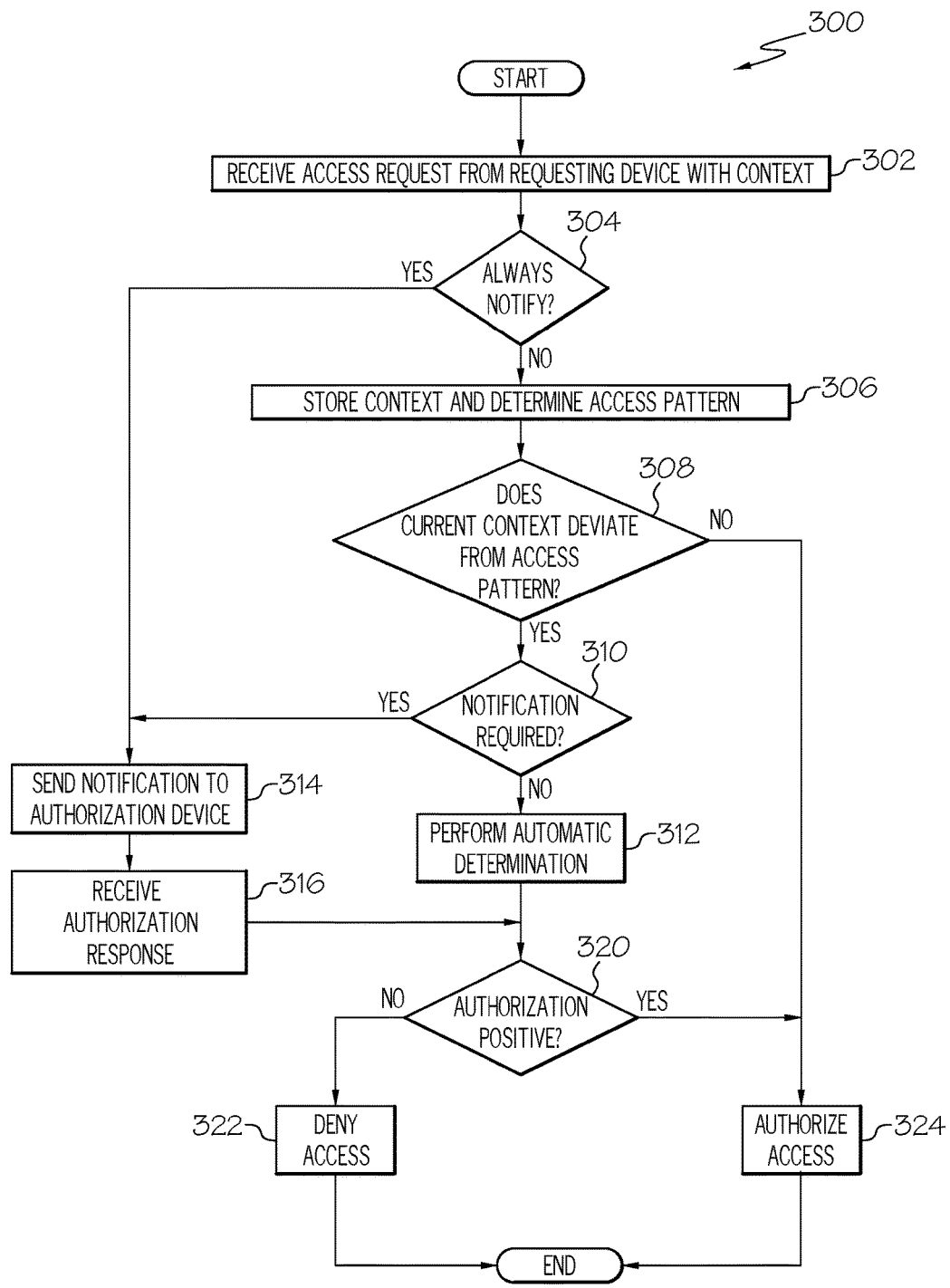
FIG. 3 illustrates an access request evaluation process, according to an example.

FIG. 3 illustrates an access request evaluation process 300, according to an example. The access request evaluation process 300 is an example of processing performed by the user security analytics module 104 discussed above.

The access request evaluation process 300 receives, at 302, an access request from a requesting device to access data. This request in an example includes an indication of the context of the requesting device. As discussed above, the context of the requesting device is able to be any suitable context, including, for example, a geographic location of the requesting device. In an example, determining a context for the requesting device includes extracting context data from the access request or from other communications with the requesting device. In some examples, further context information is able to be determined based on information from other sources, such as geographic location information for the requesting device obtained from any source.

In general, the access for data is able to specify a request to access all of the data or for only a portion of the data. The request to access the data is also able to specify a particular type of access, such as access to only view the data, access to modify the data, access to resend the data to other devices, any other type of use, or combinations of these.

In one example, the access request evaluation process 300 determines, at 304, if the access rules for the data require that an authorization device 120 always be notified of access requests. In an example, this configuration is set via the data set protection configuration interface 200 described above. If notifications are to be provided, the notification is provide, at 314, and processing continues as described below.

If notifications are not to always be provided, the access request evaluation process 300 in one example stores, at 306, the context of the requesting device and further determines or refines an access pattern for the data for which access is being requested. In an example, access patterns are determined by noting characteristics that are often present in the contexts of requesting devices that request access to the data for which the access request is received. In some examples, the access pattern may record contexts of requesting devices that sent access requests that were allowed by the decision module 106. In some examples, an access pattern for new data is determined based on several initial access requests that are processed by the decision module 106. In an example, determining an access pattern is able to include determining the access pattern based on characteristics of multiple received access requests for the requested data. Determining the access pattern is also able to be based on authorization responses received in response to the multiple decisions requests. For example, if decisions were made to allow previously received access requests with context characteristics, an access pattern may indicate that access requests from requesting devices with similar contexts conform to the access pattern and are not suspect so they should be allowed.

The access request evaluation process 300 continues by determining, at 308, if the current context deviates from the determined access pattern. As described above, an access pattern is determined in some examples based on contexts of requesting devices that sent a previous access requests for the data or related data. If the context of the requesting device that sent the access request is determined to not deviate from the access pattern identified over several prior access requests, the requested access is authorized, at 324.

If the context of the requesting device that sent the access request is determined to deviate from the access pattern, a determination is made as to whether notification is to be sent to an authorization device 120. If a notification is not to be sent to the authorization device 120, an automatic determination of whether to approve or deny the access request is performed, at 312. Such an automatic determination is able to be determined by any suitable technique, such as applying hard decision rules, fuzzy logic decision rules, artificial intelligence techniques, any other technique, or combinations of these. In general, this automatic determination is able to be based on any suitable factor or factors, including but not limited, to a present context of the requesting device, one or more patterns of access requests by the requesting device, one or more patterns of access requests by a number of requesting devices with common contextual characteristics, one or more patterns of access requests by all requesting devices, based on any information, or based on combinations of these.

The automatic determination performed, at 312, is also able to determine to only grant a subset of the permissions that were requested in the received access request. For example, a requesting device may send an access request for full access to a data set. The automatic determination may decide, based on any suitable context of the requesting device, to grant read-only access to the requesting device. In another example, a requesting device may send an access request to print ten (10) pages of a document. Based on various criteria, such as a printing history of that particular requesting device, the automated process may determine to only authorize permission to print 8 pages. In general, a determination to allow a subset of permissions requested in an authorization request is able to be based on any suitable factor or factors, including but not limited to the factors or factors listed above upon which an automatic determination is made.

If a notification is determined to be sent to an authorization device, either based on a configuration to always notify determined at 304 or a determination that notification is required at 310, the notification is sent to the authentication device, at 314. This notification is able to provide information regarding the context of the requesting device, such as is presented in an example described below.

After the notification is sent, an authorization response is received, at 316. In some examples, not receiving a response is interpreted as a response to deny access. The authorization determined either based on the received authorization response from the authentication device 120 or based on the automatic determination is determined to be either positive or negative, at 320. If the authorization is determined to be positive, at 320, the requested access in one example is authorized and allowed. In further examples, as described above, the authorization is able to specify that only a subset of the requested permissions is to be authorized for the requesting device, where the subset is fewer than the total set of permissions requested. In the case of an authorization that authorizes only a subset of the requested permissions, the access using only subset of permissions is authorized, at 324. If the authorization is determined to not be positive, at 320, the requested access is denied. The access request evaluation process 300 then ends.

Figure 4:
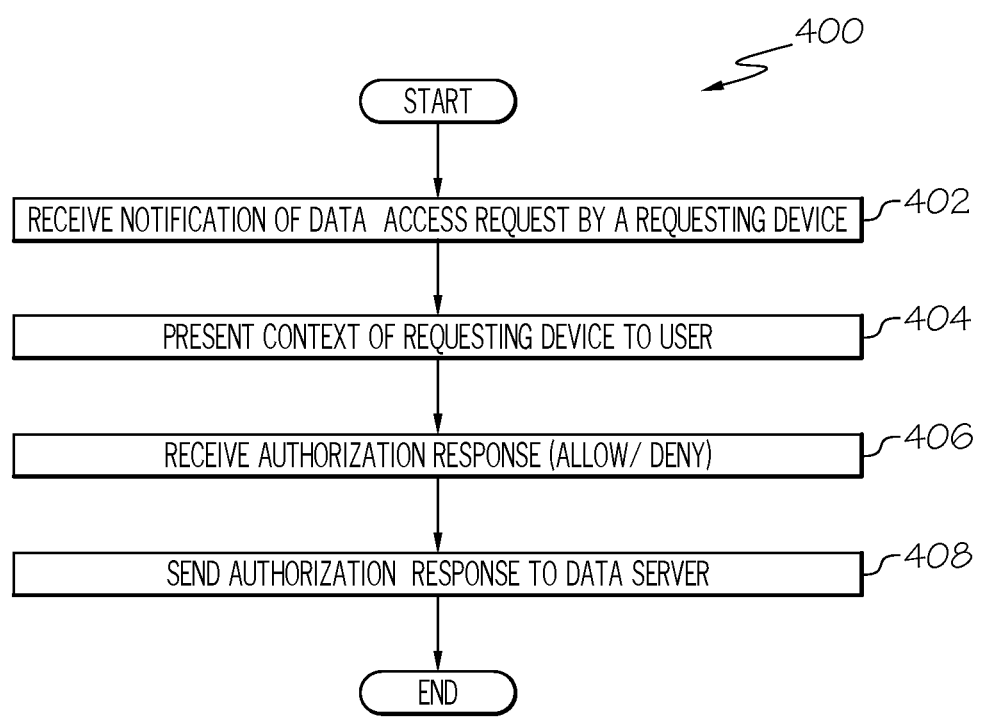
FIG. 4 illustrates a notification handling process, according to an example.

FIG. 4 illustrates a notification handling process 400, according to an example. The notification handling process 400 in one example is performed by an authorization device 120 upon receiving a notification from the notification manager 118.

The notification handling process 400 receives, at 402, a notification of a data access request by a requesting device. The notification contains indications of the context of the requesting device and an indication of the data set to which access is requested, and my include an indication of the type of access to the data is being requested, including types of uses for which the data will be accessed.

The notification handling process 400 presents, at 404, the context of the requesting device to the user. An example presentation of a context is described in further detail below.

The notification handling process 400 receives, at 406, an authorization response from a user of the device. The authorization response is able to be either an "ALLOW" or a "DENY" input received from a user.

The notification handling process 400 sends, at 408, an indication of the authorization response. In an example, the indication is able to be sent back to the notification manager 118 that sent the notification. In further examples, the notification is able to be sent to any suitable destination or destinations, such as directly to the user security analytics module 104, directly to the DRM key manager 102, to any suitable destination, or to combinations of these. The notification handling process 400 then ends.

Figure 5:
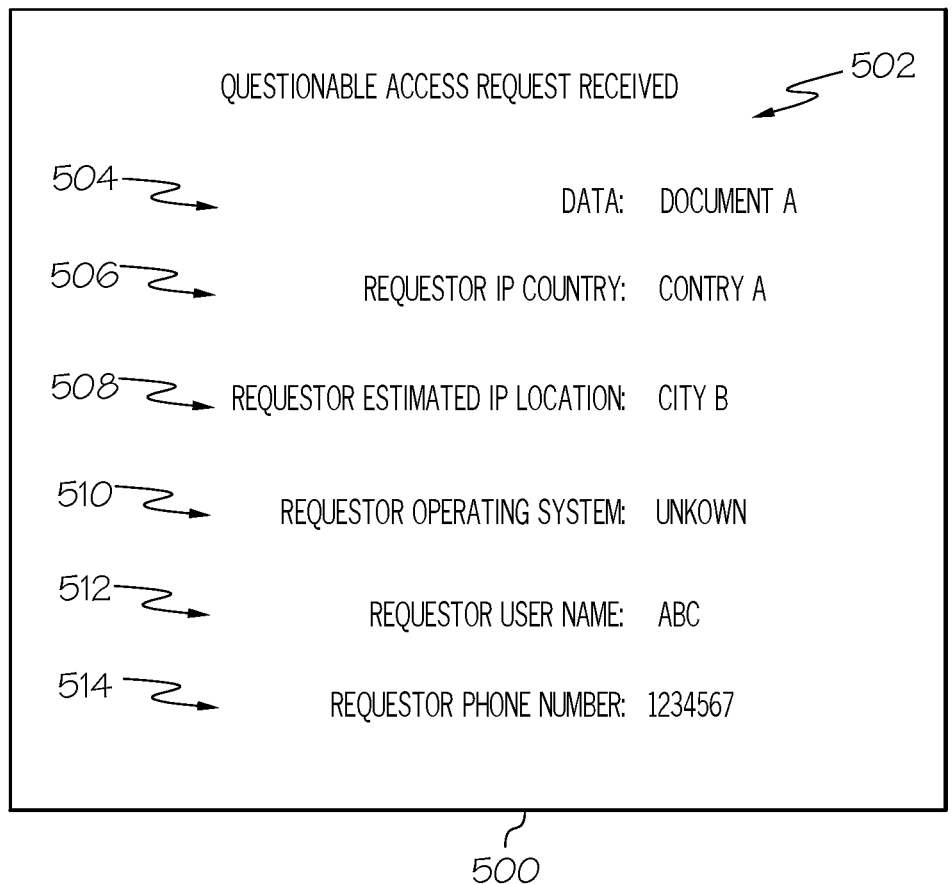
FIG. 5 illustrates a notification context display, according to an example.

FIG. 5 illustrates a notification context display 500, according to an example. The notification context display 500 is an example of a presentation of a context of a requesting device as is presented to a user of an authorizing device. The notification context display 500 is an example of a presentation presented by the notification handling process 400 described above.

The notification context display 500 displays information associated with an access request that is received from a requesting device. The notification context display 500 presents information that is either provided by the requesting device, or information that is derived based on information associated with the requesting device.

The notification context display 500 has a title 502 that indicates "QUESTIONABLE ACCESS REQUEST RECEIVED." This title notifies the user of the authorization device that an access request was received for which his or her approval or denial is to be provided. The notification context display 500 includes information included in the access request. Information included in the access request includes information in a "DATA" line 504, which in this example indicates that the access request is for "DOCUMENT A."

In general, an access request will include an Internet Protocol (IP) address of the requesting device. In the illustrated example, the notification handling process 400 determines a country associated with the specified IP address, and determines a city in which the IP address is likely located. Such information is able to be determined by any suitable technique. The notification context display 500 includes a "REQUESTOR IP COUNTRY" line 506 that indicates the IP address of the requesting device is associated with devices in "COUNTRY A." A "REQUESTOR ESTIMATED IP LOCATION" line 508 indicates a city "CITY B" is a likely location within COUNTRY A for the IP of the requesting device.

Other information provided by the requesting device sending the access request includes information presented in A "REQUESTOR OPERATING SYSTEM" line 512 that indicates that the access request indicated that the operating system of the requesting device is "UNKNOWN." In some examples, the operating system of the device may be specified by the requesting device or the operating system is able to be determined by any suitable technique. A "REQUESTOR USER NAME" line 412 indicates that the name of the user of the requesting device is "ABC" in this example. A "REQUESTOR PHONE NUMBER" line 414 indicated that the phone number of the user of the requesting device is "1234567."

The notification context display 500 includes an "ALLOW" button 520 and "DENY" button 522. A user of the authorization device presenting the notification context display 500 is able to select one of these buttons as the authorization response that is received by the notification handling process 400, described above.

Figure 6:
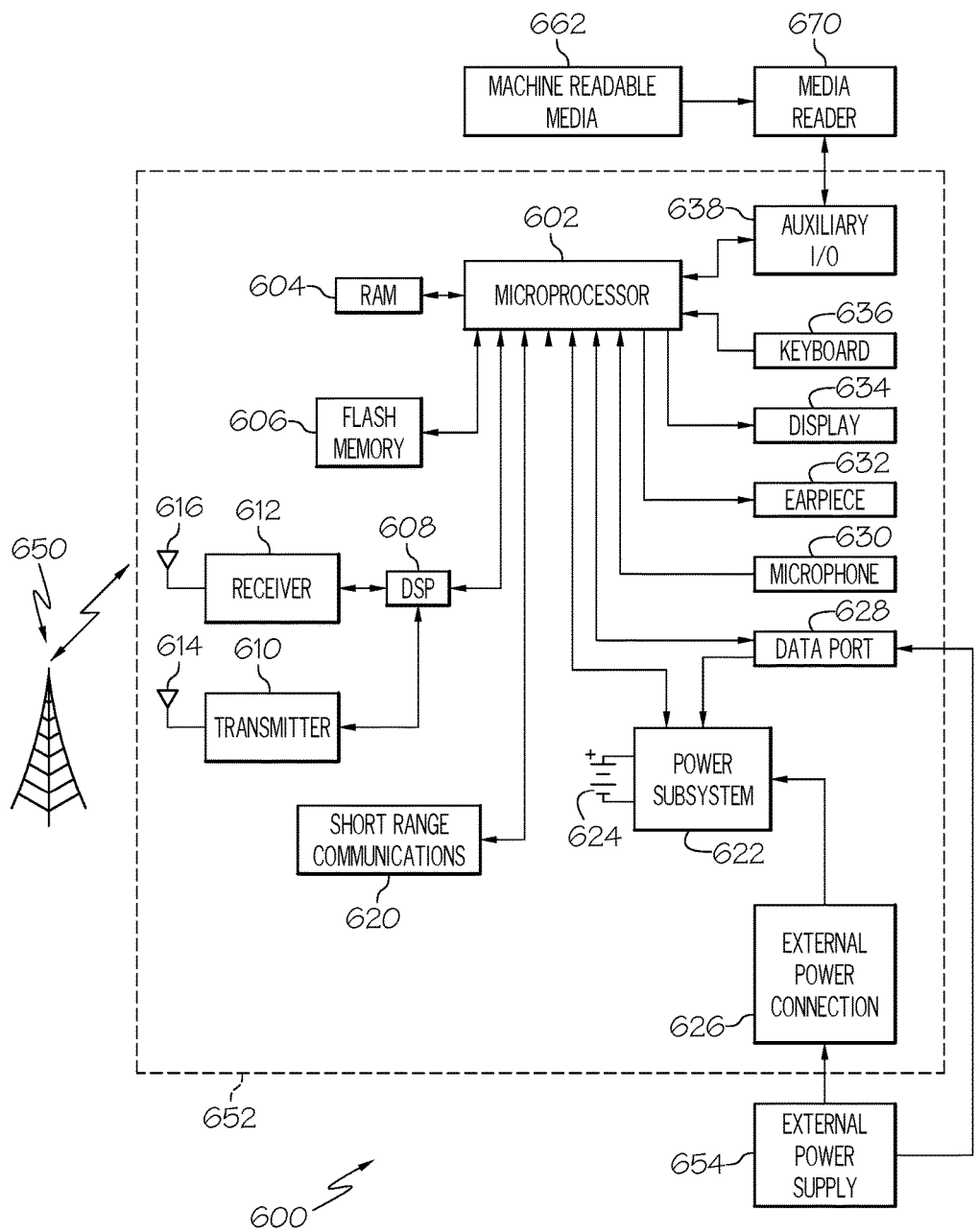
FIG. 6 is a block diagram of an electronic device and associated components in which the systems and methods disclosed herein may be implemented.

FIG. 6 is a block diagram of an electronic device and associated components 600 in which the systems and methods disclosed herein may be implemented. In various examples, the electronic device 652 is able to be an example of a wireless two-way communication device. The electronic device 652 in various examples is able to be a device that performs data communications, data and voice communications, text communications, various other types of communications, or combinations of these. Such electronic devices communicate with one or more networks 650, which are able to include wired or wireless communications capabilities for voice, text, data or combinations of these. In an example, the networks 650 use any suitable wired or wireless communications protocol. Wireless voice communications may be performed using either an analog or digital wireless communication channel. Data communications allow the electronic device 652 to communicate with other computer systems in some examples via the Internet. Examples of electronic devices that are able to incorporate the above described systems and methods include, for example, a data messaging device, a two-way pager, a cellular telephone with text and data messaging capabilities, a wireless Internet appliance or a data communication device that may or may not include telephony capabilities.

The illustrated electronic device 652 is an example electronic device that includes two-way wireless communications functions. Such electronic devices may incorporate communication system elements such as a wireless transmitter 610, a wireless receiver 612, and associated components such as one or more antenna elements 614 and 616. A digital signal processor (DSP) 608 performs processing to extract data from received wireless signals and to generate signals to be transmitted. The particular design of the communication system may be dependent upon the communication network and associated wireless communications protocols with which the device is intended to operate.

The electronic device 652 includes a microprocessor 602 that controls the overall operation of the electronic device 652. The microprocessor 602 interacts with the above described communications system elements and also interacts with other device systems. In various examples, the electronic device 652 is able to include one or more of various components such as a data storage 606, random access memory (RAM) 604, auxiliary input/output (I/O) device 638, data port 628, display 634, keyboard 636, earpiece 632, audio sound reproduction system 670, microphone 630, a short-range communications system 620, a power system 622, other systems, or combinations of these.

One or more power storage or supply elements, such as a battery 624, are connected to a power system 622 to provide power to the circuits of the electronic device 652. The power system 622 includes power distribution circuitry for providing power to the electronic device 652 and also contains battery charging circuitry to manage recharging the battery 624 (or circuitry to replenish power to another power storage element). The power system 622 receives electrical power from external power supply 654. The power system 622 is able to be connected to the external power supply 654 through a dedicated external power connector (not shown) or through power connections within the data port 628. The power system 622 includes a battery monitoring circuit that is operable to provide a status of one or more battery status indicators, such as remaining capacity, temperature, voltage, electrical current consumption, and the like, to various components of the electronic device 652.

The data port 628 is able to support data communications between the electronic device 652 and other devices through various modes of data communications, such as high speed data transfers over an optical communications circuits. Data port 628 is able to support communications with, for example, an external computer or other device. In some examples, the data port 628 is able to include electrical power connections to provide externally provided electrical power to the electronic device 652, deliver electrical power from the electronic device 652 to other externally connected devices, or both. Data port 628 of, for example, an electronic accessory is able to provide power to an electronic circuit, such as microprocessor 602, and support exchanging data between the microprocessor 602 and a remote electronic device that is connected through the data port 628.

Data communication through data port 628 enables a user to set preferences through the external device or through a software application and extends the capabilities of the device by enabling information or software exchange through direct connections between the electronic device 652 and external data sources rather than via a wireless data communication network. In addition to data communication, the data port 628 provides power to the power system 622 to charge the battery 624 or to supply power to the electronic circuits, such as microprocessor 602, of the electronic device 652.

Operating system software used by the microprocessor 602 is stored in data storage 606. Examples of data storage 606 are able to include, for example, flash memory, magnetic based storage devices, other volatile or non-volatile data store elements, or the like. Some examples are able to use data storage 606 that includes a battery backed-up RAM or other non-volatile storage data elements to store operating systems, other executable programs, or both. The operating system software, device application software, or parts thereof, are able to be temporarily loaded into volatile data storage such as RAM 604. Data received via wireless communication signals or through wired communications are also able to be stored to RAM 604.

The microprocessor 602, in addition to its operating system functions, is able to execute software applications on the electronic device 652. A set of applications that control basic device operations, including at least data and voice communication applications, is able to be installed on the electronic device 652 during manufacture. In an example, programs and other data used to support the processes described above are able to be installed in the memory of the electronic device 652. Further examples of applications that are able to be loaded onto the device may be a personal information manager (PIM) application having the ability to organize and manage data items relating to the device user, such as, but not limited to, e-mail, calendar events, voice mails, appointments, and task items. The applications are able to include the above described base applications, which may be installed during manufacture or from another trusted and verified source, along with user applications that may be installed at any time.

Further applications may also be loaded onto the electronic device 652 through, for example, the wireless network 650, an auxiliary I/O device 638, Data port 628, short-range communications system 620, or any combination of these interfaces. Such applications are then able to be installed by a user in the RAM 604 or a non-volatile store for execution by the microprocessor 602.

In a data communication mode, a received signal such as a text message or web page download is processed by the communication system, including wireless receiver 612 and wireless transmitter 610, and communicated data is provided the microprocessor 602, which is able to further process the received data. In some examples, the electronic device 652 includes a display, output ports, or combinations of these. In such examples, the received data is able to be processed for output to the display 634, or alternatively, to an auxiliary I/O device 638 or the Data port 628. In examples of the electronic device 652 that include a keyboard 636 or other similar input facilities, a user of the electronic device 652 may also compose data items, such as e-mail messages, using the keyboard 636, which is able to include a complete alphanumeric keyboard or a telephone-type keypad, in conjunction with the display 634 and possibly an auxiliary I/O device 638. Such composed items are then able to be transmitted over a communication network through the communication system.

For voice communications, overall operation of the electronic device 652 is substantially similar, except that received signals are generally provided to an earpiece 632 and signals for transmission are generally produced by a microphone 630. Alternative voice or audio I/O systems, such as a voice message recording system, may also be implemented on the electronic device 652. Although voice or audio signal output is generally accomplished primarily through the earpiece 632, in examples of electronic devices 652 that include a display 634, the display 634 may also be used to provide an indication of the identity of a calling party, the duration of a voice call, or other voice call related information, for example.

Depending on conditions or statuses of the electronic device 652, one or more particular functions associated with a system circuit may be disabled, or an entire system circuit may be disabled. For example, if the battery temperature is low, then voice functions may be disabled, but data communications, such as e-mail, may still be enabled over the communication system.

A short-range communications system 620 provides for data communication between the electronic device 652 and different systems or devices, which need not necessarily be similar devices. For example, the short-range communications system 620 includes an infrared device and associated circuits and components or a Radio Frequency based communication module such as one supporting Bluetooth® communications, to provide for communication with similarly-enabled systems and devices, including the data file transfer communications described above. The short-range communications system is also able to include one or more of components to support communications over wireless links such as Wi-Fi®, Near Field Communications (NFC), any other short range link, or combinations of these.

A media reader 660 is able to be connected to an auxiliary I/O device 638 to allow, for example, loading computer readable program code of a computer program product into the electronic device 652 for storage into flash memory 606. One example of a media reader 660 is an optical drive such as a CD/DVD drive, which may be used to store data to and read data from a computer readable medium or storage product such as computer readable storage media 662. Examples of suitable computer readable storage media include optical storage media such as a CD or DVD, magnetic media, or any other suitable data storage device. Media reader 660 is alternatively able to be connected to the electronic device through the Data port 628 or computer readable program code is alternatively able to be provided to the electronic device 652 through the wireless network 650.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

NON-LIMITING EXAMPLES

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method, comprising:
   accumulating a history of access requests for a requested data over a time period, the history of access requests comprising a respective context for access requests received during the time period;
   determining, based on an analysis of the respective context contained in each access request in the history of access requests for the requested data, an access pattern for the requested data,
   receiving, after accumulating the history of access requests, a present access request from a requesting device to access requested data;
   determining a context for the requesting device sending the present access request;
   determining a deviation between the context for the requesting device sending the present access request and the access pattern;
   comparing, based on determining the deviation, the context of the present requesting device to contexts defined in the access pattern; and
   allowing, based on the comparing, access to the requested data.

2. The method of claim 1, wherein the requested data is protected by at least one of digital rights management or information rights management, and
   wherein allowing access comprises granting a key under the digital rights management or information rights management.

3. The method of claim 1, wherein the comparing comprises requesting authorization from an automated decision process, and
   wherein the allowing is based on a response received from the automated decision process.

4. The method of claim 1, further comprising sending, based on the comparing, a notification comprising the context for the requesting device to an authorization device associated with the requested data, wherein the authorization device receives an authorization decision for the present access request from a user of the authorization device, and
   wherein the allowing is further based on a response to the notification that is received from the authorization device.

5. The method of claim 4, further comprising receiving, during configuration of protection for the requested data, an identifier of the authorization device associated with the requested data.

6. The method of claim 1, wherein the comparing comprises:
   selecting, based on a selection specification in an access rule associated with the requested data, between sending a notification to an authorization device that receives an authorization decision from a user of the authorization device or requesting authorization from an automated decision process; and
   sending, based on the selecting, either one of:
      the notification to the authorization device, or
      a decision request to the automated decision process, and
   wherein the allowing is further based on a response respectively received from one of the authorization device and the automated decision process.

7. The method of claim 6, wherein the selection specification is based upon criteria provided by a user input during definition of access control for the requested data.

8. A device, comprising:
   a context processor that, when operating:
      accumulates a history of access requests for a requested data over a time period, the history of access requests comprising a respective context for access requests received during the time period;
      determines, based on an analysis of respective context contained in each access request in the history of access requests for the requested data, an access pattern for the requested data,
      determines a context for a requesting device sending a present access request for the requested data;
      determines a deviation between the context for the requesting device sending the present access request and the access pattern;
      compares, based on determining the deviation, the context of the present requesting device to contexts defined in the access pattern; and
      allows, based on a comparison of the context of the present requesting device to contexts defined in the access pattern, access to the requested data; and
   a data interface that, when operating, receives the present access request from the requesting device to access the requested data.

9. The device of claim 8, wherein the requested data is protected by at least one of digital rights management or information rights management, and
   wherein the context processor, when operating allows access by granting a key under the digital rights management or information rights management.

10. The device of claim 8, wherein the context processor, when operating, compares by further:
    selecting, based on a selection specification in an access rule associated with the requested data, between sending a notification to an authorization device that receives an authorization decision from a user of the authorization device or requesting authorization from an automated decision process; and
    sending, based on the selecting, either one of:
       the notification to the authorization device, or
       a decision request to the automated decision process, and
    wherein the context processor allows access further based on a response respectively received from one of the authorization device and the automated decision process.

11. The device of claim 10, wherein the selection specification is based upon criteria provided by a user input during definition of access control for the requested data.

12. A non-transitory computer readable storage medium having computer readable program code embodied therewith, the computer readable program code comprising instructions for:
   accumulating a history of access requests over a time period, the history of access requests for a requested data, the history of access requests comprising a respective context for access requests received during the time period;

determining, based on an analysis of respective context contained in each access request in the history of access requests for the requested data, an access pattern for the requested data, receiving, after accumulating the history of access requests, a present access request from a requesting device to access requested data;

determining a context for the requesting device sending the present access request;

determining a deviation between the context for the requesting device sending the present access request and the access pattern;

comparing, based on determining the deviation, the context of the present requesting device to contexts defined in the access pattern; and allowing, based on the comparing, access to the requested data.

13. The non-transitory computer readable storage medium of claim 12, wherein the instructions for comparing comprise instructions for:

selecting, based on a selection specification in an access rule associated with the requested data, between sending a notification to an authorization device that receives an authorization decision from a user of the authorization device or requesting authorization from an automated decision process; and sending, based on the selecting, either one of:
the notification to the authorization device, or
a decision request to the automated decision process, and wherein the allowing is further based on a response respectively received from one of the authorization device and the automated decision process.

14. The non-transitory computer readable storage medium of claim 13, wherein the selection specification is based upon criteria provided by a user input during definition of access control for the requested data.

15. The method of claim 1, wherein determining the access pattern is further based on a respective context of each allowed access request and each denied access request in the accumulated history of access requests.

16. The method of claim 1, wherein the determining the access pattern for the requested data is further based on access requests received from plurality of devices requesting access to the requested data.

17. The method of claim 4, wherein the notification comprises the context for the requesting device that further comprises:

an indication of a country associated with an IP address of the requesting device;

an indication of an estimated location associated with the IP address of the requesting device; and an indication of a phone number associated with the requesting device.

* * * * *